UNITED STATES PATENT OFFICE.

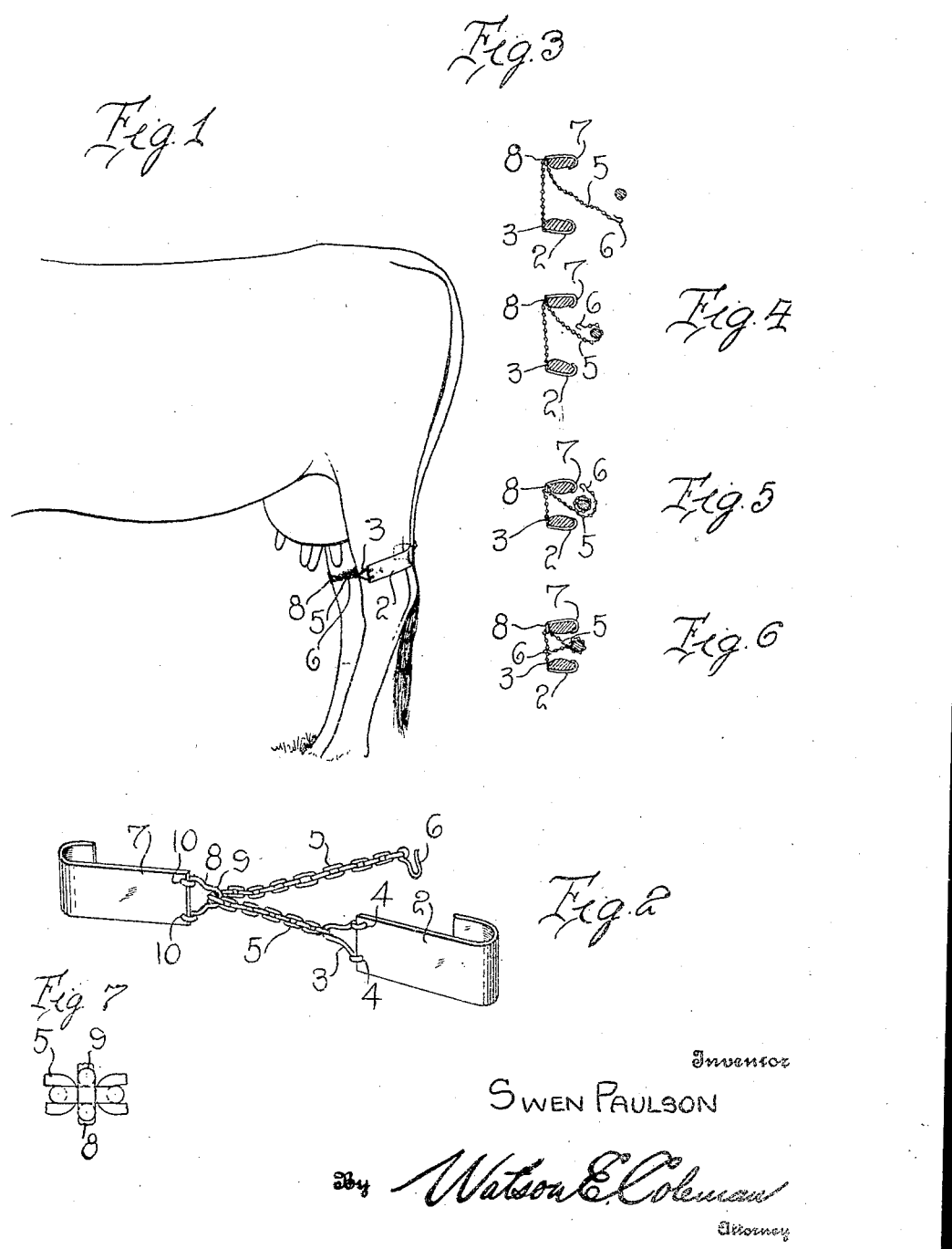

SWEN PAULSON, OF HEBER, UTAH.

MILKING-HOBBLE.

1,189,865.  Specification of Letters Patent.  Patented July 4, 1916.

Application filed October 9, 1915. Serial No. 55,000.

*To all whom it may concern:*

Be it known that I, SWEN PAULSON, a subject of the King of Sweden, residing at Heber, in the county of Wasatch and State of Utah, have invented certain new and useful Improvements in Milking-Hobbles, of which the following is a specification, reference being had to the accompanying drawings.

This invention relates to hobbles, and particularly to hobbles used when milking cows.

The general object of my invention is the provision of a hobble of a very simple form, which, when attached to the cow's legs, will prevent the cow from moving and also prevent the cows from switching their tails.

A further object is to provide a hobble which may be very easily attached and detached and which may be adjusted to hobble the cow to a greater or less degree.

Other objects will appear in the course of the following description.

My invention is illustrated in the accompanying drawings, wherein:

Figure 1 is a view showing my milking hobble in its applied position; Fig. 2 is a perspective detail view of the hobble detached; Figs. 3, 4, 5 and 6 are detail views showing the manner in which the device is applied to the legs of the cow; Fig. 7 is a detail plan view looking down on the top of the grab link 8 to show the manner in which this link interlocks with the links of the chain 5.

Referring to these figures it will be seen that my improved hobble comprises the hook-shaped plate 2 or shackle. The rebent portion of this plate extends approximately half way of the body of the plate and is designed to engage one leg of the cow just above the hock joint. Connected to the hook-shaped plate or shackle 2 is a link 3, the ends of which are engaged through openings 4 in the plate or shackle 2, and connected to this link 3 is a chain 5 of any desired length to the end link of which is connected the hook 6. Adapted to be detachably engaged with any one of the links of the chain 5 is a hook-shaped plate or shackle 7 which has the same form as the plate 2. To this shackle 7 is connected the link 8, this link being formed with a contracted middle portion 9 and legs which at their ends are passed through perforations 10 in the plate and then bent to form eyes. This contracted portion 9 of the link 8 has approximately a width equal to the thickness of the metal forming the links 5, and this link 9 constitutes a grab link which may be engaged with any of the links 5 as illustrated in the drawings.

In practical operation the shackles 2 and 7 are hooked over the hind legs of the cow just above the hock joints. The chain 5 is then passed in front of the hind legs and is pulled tight and engaged by the grab link 8. The free portion of the chain is then looped around the cow's tail and the hook 6 is engaged with one of the links of the chain 5. I have found in practice that this hobble is very effective, prevents a cow from moving while being milked and also prevents the cow from flourishing its tail.

Having thus described my invention, what I claim is:

1. A milking hobble comprising a hook-shaped member adapted to be engaged with a cow's leg, a chain attached thereto, and a hook-shaped member adapted to be engaged with another leg of the cow and having a grab link thereon adapted to be engaged with any one of the links of the chain, the extremity of the chain being provided with a hook whereby the extremity may be wound around the cow's tail and the hook engaged with one of the links of the chain.

2. A hobble of the character described comprising a hook-shaped plate, a chain permanently connected to said plate, a hook attached to the end link of the chain, and a hook-shaped plate formed at one end with a grab link, this link being contracted at its free end to less than the width of any one of the links of the chain through which plate the chain passes.

In testimony whereof I hereunto affix my signature in the presence of two witnesses.

SWEN PAULSON.

Witnesses:
CHASE HATCH,
ANNA CLEGG.